July 22, 1952  C. W. KAYSING ET AL  2,604,339
FLEXIBLE TAILPIPE CONNECTION
Filed March 29, 1948
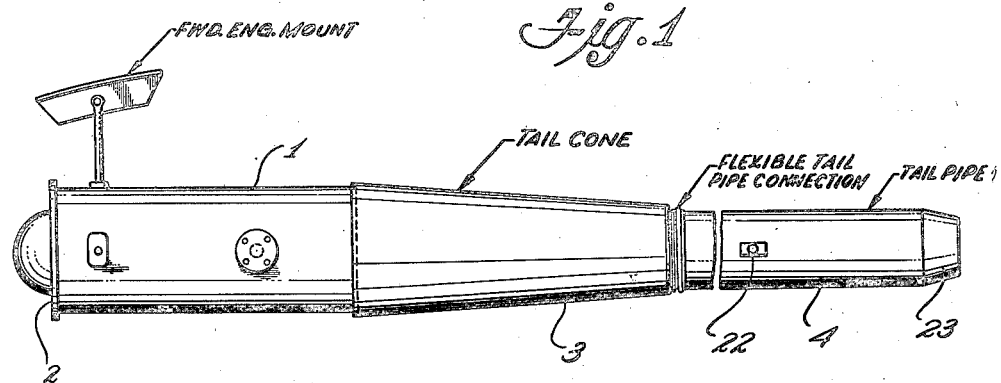
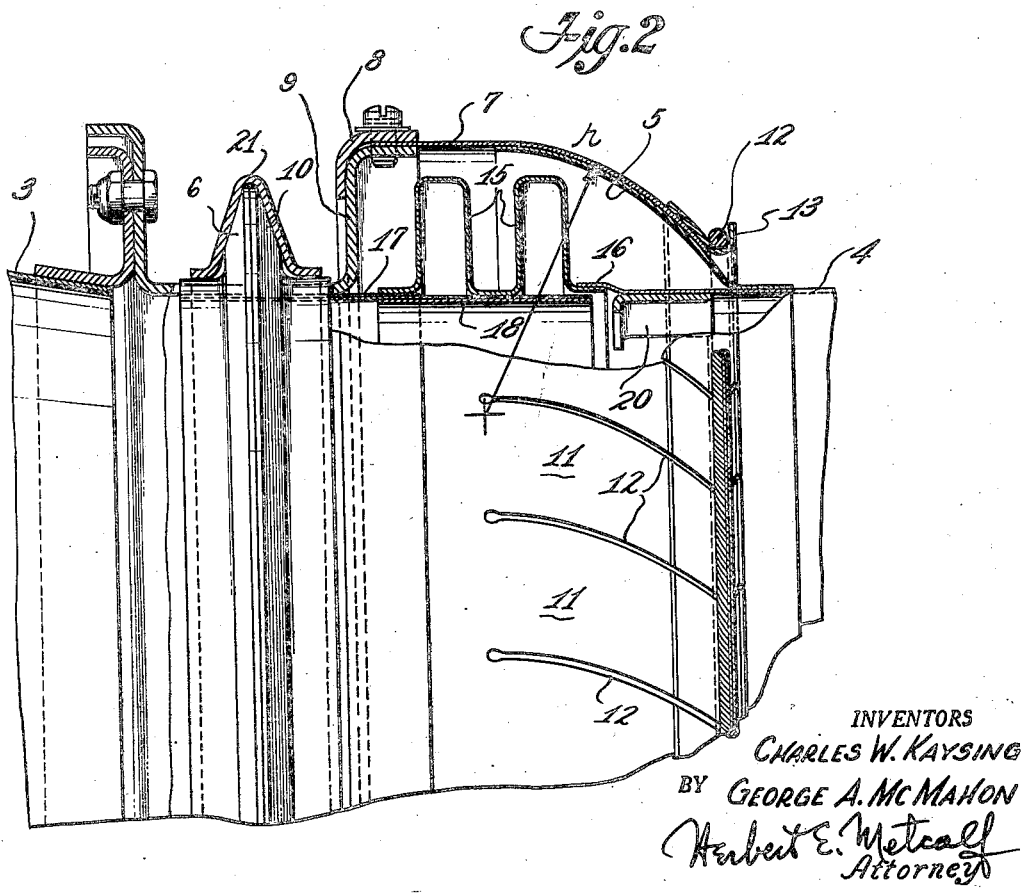
INVENTORS
CHARLES W. KAYSING
BY GEORGE A. McMAHON
Herbert E. Metcalf
Attorney Patented July 22, 1952

2,604,339

UNITED STATES PATENT OFFICE 2,604,339

FLEXIBLE TAIL PIPE CONNECTION

Charles W. Kaysing, Hawthorne, and George A. McMahon, Los Angeles, Calif., assignors to Northrop Aircraft, Inc., Hawthorne, Calif., a corporation of California Application March 29, 1948, Serial No. 17,748

3 Claims. (Cl. 285—90)

The present invention relates to flexible pipe connections, and more particularly to a flexible connection suitable for use between a jet engine and a tailpipe attached thereto.

When jet engines, such as the well known turbo-jet machines, are installed in airplanes to drive them by the hot gases jetted from the engines, it is in many instances desirable to provide a relatively long tailpipe attached to the tail cone of the engine, in order that the jet gases emerge at the proper place on the airplane. For economy of weight, both the jet engine casing and tail cone, and the attached tailpipe are made of as light a material as possible, and if stresses can be reduced at various points, additional weight savings can be made.

As tailpipe diameters are relatively large in large jet engines (between 1 and 3 ft. in diameter), and as the hot jet gases do not uniformly heat the tailcone or tailpipe walls, thereby causing unbalanced circumferential stresses, long tailpipes rigidly attached to jet engine tailcones may exert stresses on the engine tailcone beyond the design limits of the tailcone walls. A flexible connection between the tailpipe and engine tailcone is thus desirable, and furthermore, this flexible connection must be designed to reduce, as far as possible, the transmission of stresses between tailpipe and tailcone. It is an object of the present invention to provide a gas-tight flexible connection between two pipes undergoing differing stresses, that reduces transmission of stresses between said pipes to a minimum value.

In addition, as the tailpipe stresses are not uniform circumferentially, it is another object of the present invention to provide a flexible connection between two pipes permitting local adjustment around the connection.

In many instances the tailpipe is stressed by the jet flow, developing a longitudinal separation force applied at the flexible connection. When this occurs, it is highly desirable that the connection be able to operate freely. It is, therefore, another object of the present invention to provide a flexible connection between two pipes subject to a separation force, wherein frictional resistance to stress adjustments in the connection is also reduced to a minimum.

Other objects and advantages of our invention will be more readily understood by reference to the drawings in which:

Figure 1 is a diagrammatic side view showing a tailpipe attached to the tailcone of a turbojet engine and showing the location of the flexible connection of the present invention.

Figure 2 is a view partly in elevation and partly cut away in section of a preferred form of the flexible connection of the present invention.

Referring first to Figure 1, a turbo-jet engine 1 is provided with a forward air intake 2 which conducts air to a compressor, fuel burners and turbine linked to drive the compressor inside the engine. These elements are not shown, as they vary in detail and are well known in the art. Aft of the turbine position is a tailcone 3 within which the gases are expanded after leaving the turbine and is supplied by the engine manufacturer as part of the engine casing. When the engine is to be installed in an all-wing airplane, for example, it is usually desirable that the air intake 2 be near the leading edge of the airplane wing, and that the jet exhaust be at the trailing edge of the wing. To conduct the jet to the trailing edge, a tailpipe 4 may be necessary to provide the proper jet exhaust position. This tailpipe, in certain instances, can be 8 ft. long, for example, and from 1 to 3 ft. or more in diameter. As all the hot jet gases pass through this tailpipe, which for minimum weight may be made of corrosion resistant steel .032" thick, severe stresses can be set up therein. To reduce the transmission of these stresses to tailcone 3, a preferred flexible connection made in accordance with the present invention is provided between tailpipe 4 and tailcone 3, as shown in more detail in Figure 2.

While it might appear that an ordinary ball joint connection could be used between tailcone and tailpipe, it has been found that such a joint transfers undesirable shearing stresses to the tailcone and does not operate well under a separation stress. The joint shown in Figure 2 differs radically in action from the action of a ball joint.

Around the forward end of the tailpipe 4 is welded, or otherwise suitably attached, a tailpipe bell 5 whose radius of curvature has its center lying outside the turbo-jet adapter flange 6, fastened to the end of tailcone 3. Thus the radius of the bell is very substantially less than the radius of the tailpipe. The bell 5 is thus part of a toroid, the radii $r$ of which center on a circle substantially concentric with the tailcone 3 and the tailpipe 4. The tailpipe bell 5 is covered by a split, curved shell 7, that may be made in four sections for convenience. This shell is attached by a clamp ring 8 to a stationary ring 9, which in turn is attached to a mating flange 10 joined to adapter flange 6 on the tailcone 3. The shell 7 has substantially the same radius of curvature as the tailpipe bell 5, but is preferably made of thinner gauge material than the bell, so that fingers 11 created by cuts 12 of the split shell 7 can readily deflect under local or circumferential stress, leaving the tailpipe bell 5 in the same rigid shape. The shell 7 is held snugly in position by a flexible but not lengthwise extensible cable 12a wrapped in a retainer 13 securely fastened to the tailpipe end of the shell 7. The cable 12a is preferably adjustable in length so that it may be drawn up tight when installed.

To prevent gas leakage through the flexible joint thus formed, an expansion bellows 15 is provided, having one end 16 securely attached to the tailpipe 4 and the other end 17 attached to the inside of the stationary ring 9. The bellows 15 is protected from hot gases by a cylindrical heat shield 18 attached at one end only to the inside of the adapter flange 6, and projecting toward the tailpipe 4 while nearly in contact with the smaller diameter surfaces of the bellows 15. This heat shield also preserves a constant diameter between the two pipes, reducing turbulence at the joint. However, this heat shield 18 may, if desired, be attached to the forward edge of the bellows 15. To prevent the bellows 15 from being unduly compressed in case the tailpipe 4 should be forced forward toward the engine, circumferential stops 20 are attached to the tailpipe at the proper distances to the rear of, and in line with, the heat shield 18 when the connection is installed.

When installed, the mating flange 10 abuts the adapter flange 6, fitting over and around the heat shield 18, and the two flanges are held tightly together by a V-shaped quick-disconnect clamp 21. The rear support of the tailpipe 4 may consist of two opposite trunnion pins 22 (Figure 1), for example, entering fittings on the airplane frame, which permit the forward end of the tailpipe to move upwardly or downwardly or sufficiently sideways to allow for uneven lateral expansions of the flexible connection, as well as allowing longitudinal elongation of the tailpipe due to the expansion caused by heat when the jet engine is running.

When the tailpipe connection as described is stressed by hot swirling gases, the expansion bellows 15 will naturally resist forces tending to set up a shearing action at the turbo-jet rear face, but will accommodate rocking motions about its approximate center. Since the fingers 11 of the split curved shell 7 will easily deflect inwardly or outwardly, this latter action positively determines that the center of rocking of the tailpipe will lie somewhere in the space inside the bellows, instead of farther forward in the turbo-jet casing, as would be the case if the sliding motion of a ball joint were to be utilized. Therefore, a minimum of stress of any type is applied by the tailpipe to the turbo-jet unit itself, and the bellows is not subjected to any substantial shearing force. As the fingers of the split shell 7 on one side deflect outwardly, the opposite side will deflect inwardly, and the flexible cable 12a merely readjusts itself to the new position, and is thus not called upon to increase or decrease its tension.

If the rear end of the tailpipe 4 can be contracted to form a nozzle 23 (Figure 1) as is sometimes desirable, a constant rearward force will be exerted on the tailpipe by the escaping gases. This will require balancing forces between the surfaces of the tailpipe bell 5 and the split shell 7, the resultants of which will be along the radii of the curved surfaces. The slope of the curved surfaces at the center of concentration of these resultant forces, if nearly flat, will give a higher resultant force than if the slope is steeper. Therefore, since the radius of curvature of the two mating surfaces embodied in this invention is very much shorter than that of a ball joint at this location, the slope is steeper, and the resultant forces are smaller, so that substantially smaller friction loads have to be overcome in order to effect a sliding motion of the two curved surfaces relative to each other, and thus deflect the connection. For example, assuming a 50 p. s. i. rearward pressure, the particular connection shown in Figure 2 has a slope angle of approximately 45 degrees where the cable presses on the shell, making the resultant pressure equal to 70 p. s. i., whereas with a slope angle of, say 14 degrees, as might be present in a true ball joint, the resultant pressure would amount to approximately 200 p. s. i. Thus, the flexible connection of the present invention permits easy movement in the joint when under a separation stress.

While the present invention has been described as ideally adapted to the reduction of stress transmission between a jet tailpipe and a jet engine, it will be obvious to those skilled in the art that the present invention, as exemplified by a description of a preferred embodiment shown herein by way of illustration and not limitation, can be equally well applied to other devices where similar stress condition exists. It will also be noted that there may be uses wherein the bellows may not be necessary, and it is not desired to limit the invention to the use of the bellows in combination with the joint of the present invention.

What is claimed is:

1. In combination with a pair of coaxial pipes having spaced adjacent ends, a circumferential bellows connecting the ends of said pipes, a circumferential substantially rigid bell on one of said pipes and curving outwardly around a portion of said bellows, a mating shell attached to said other pipe and fitting over said bell, the radii of curvature of said bell and shell centering on a circle substantially concentric with said coaxial pipes, said shell having a plurality of axially extending cuts therein to provide a plurality of flexible fingers therein; and means for holding said fingers in frictional contact with said bell.

2. Apparatus in accordance with claim 1 wherein a heat shield is positioned on the end of one of said pipes and extending toward the adjacent end of the other pipe between said bellows and the interior space surrounded by said bellows.

3. Apparatus in accordance with claim 1 wherein a heat shield is positioned on the end of one of said pipes and extending toward the adjacent end of the other pipe between said bellows and the interior space surrounded by said bellows, the radius of curvature of said bell and shell being such that the slope at the end of said fingers is on the order of 45°.

CHARLES W. KAYSING.
GEORGE A. McMAHON.

REFERENCES CITED

The following references are of record in the file of this patent:

UNITED STATES PATENTS

| Number | Name | Date |
|---|---|---|
| 390,240 | Legat | Oct. 2, 1888 |
| 1,165,449 | Rietz | Dec. 28, 1915 |
| 2,337,038 | Fentress | Dec. 21, 1943 |

FOREIGN PATENTS

| Number | Country | Date |
|---|---|---|
| 510,417 | France | Sept. 4, 1920 |